(12) United States Patent
Alonso et al.

(10) Patent No.: US 6,996,859 B1
(45) Date of Patent: Feb. 14, 2006

(54) TOILET SEAT COVER

(76) Inventors: Raul Alonso, 2324 SW. 61st Ave., Miami, FL (US) 33155; Gloria M. Fink, 2324 SW. 61st Ave., Miami, FL (US) 33155

( * ) Notice: Subject to any disclaimer, the term of this patent is extended or adjusted under 35 U.S.C. 154(b) by 254 days.

(21) Appl. No.: 10/446,525

(22) Filed: May 26, 2003

(51) Int. Cl.
  *A47K 13/014* (2006.01)
  *A47K 13/024* (2006.01)
  *B32B 3/026* (2006.01)
  *B32B 3/00* (2006.01)
  *D21H 11/00* (2006.01)

(52) U.S. Cl. .................. 4/245.1; 428/304.4; 428/315.9; 428/311.71; 4/244.1

(58) Field of Classification Search ............ 428/304.4, 428/315.9, 311.71, 316.6, 317.1, 317.3; 4/243.1, 4/244.1, 245.1, 245.4
See application file for complete search history.

(56) References Cited

U.S. PATENT DOCUMENTS 5,820,196 A * 10/1998 Rudys et al. .......... 296/136.08
5,987,656 A    11/1999 Kakutani
6,203,810 B1 *  3/2001 Alemany et al. ........... 424/404
2004/0189042 A1 * 9/2004 Jarrard et al. .......... 296/136.01

FOREIGN PATENT DOCUMENTS

JP        09154929 A  *  6/1997

* cited by examiner

*Primary Examiner*—Terrel Morris
*Assistant Examiner*—Lynda M. Salvatore

(57) ABSTRACT

A toilet seat cover includes top and bottom layers each having outer and inner edge portions. The top and bottom layers are preferably formed from a paper and nylon composite for providing a waterproof barrier. The toilet seat cover further includes a middle layer sandwiched between the top and bottom layers and a plurality of adhesive strips for removably attaching the toilet seat cover onto a toilet seat are attached to the bottom layer. The middle layer is preferably formed from foam material and may include a deodorizing agent impregnated therein. The toilet seat cover is preferably made from soluble material so that it can be flushed down a toilet after use.

4 Claims, 2 Drawing Sheets

TOILET SEAT COVER

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

TECHNICAL FIELD

This invention relates to a toilet seat cover and, more particularly, to a toilet seat cover including top and bottom layers formed from water proof material and adhesive for removably attaching the toilet seat cover to a toilet seat.

PRIOR ART

Sanitation has always been a problem with regard to toilet seats, particularly in public bathrooms. Wiping the seat prior to use may even be ineffective against some disease-causing organisms such as bacteria and viruses. Several attempts have been made to address this problem.

One relatively common means is the use of a circular cover which sits on the top portion of the toilet seat, with no means of securement thereon. Thus, this type of cover is prone to dislocation from its initial positioning. The frictional resistance between a typical toilet seat and typical toilet paper is quite low. Consequently, when typical toilet paper is placed on a toilet seat, it can readily slide off of the seat. In this respect, it would be desirable if a toilet seat cover provided a substantial frictional resistance against the toilet seat.

In addition, U.S. Pat. No. 1,125,847 discloses a toilet seat cover that is dispensed on a roll like toilet paper. The toilet seat cover must be unfolded from the roll in order to be used on the toilet seat. To avoid the inconvenience attendant with unfolding the toilet paper, it would be desirable if a toilet seat cover were adapted for covering a toilet seat without unfolding the toilet seat cover.

The toilet paper disclosed in U.S. Pat. No. 1,125,847 is water absorbent. As a result, liquids that are on the toilet seat, such as from a previous person, can migrate up through the toilet seat cover and contact the person using the disposable toilet seat cover. With this in mind, it would be desirable if a disposable toilet seat cover prevents migration of liquids from the toilet seat to a person using the disposable toilet seat cover.

Thus, it can be seen that a need exists for a toilet seat cover that avoids the shortcomings of the known prior art.

BRIEF SUMMARY OF THE INVENTION

In view of the foregoing background, it is therefore an object of the present invention to provide a disposable and waterproof toilet seat cover that is removably attachable to a toilet seat. These and other objects, features, and advantages of the present invention are provided by a toilet seat cover including a top layer having an outer edge portion and an inner edge portion disposed substantially uniformly therefrom. The top layer further has an upper surface and a lower surface extending between the inner and outer edge portions.

The toilet seat cover further includes a bottom layer having an outer edge portion and an inner edge portion disposed substantially uniformly therefrom. Likewise, the bottom layer further has an upper surface and a lower surface extending between the inner and outer edge portions thereof. The toilet seat cover further includes a middle layer sandwiched between the top and bottom layers and disposed between the inner and outer portions of the top and bottom layers. The toilet seat cover further includes means for removably attaching the toilet seat cover onto a toilet seat so that the toilet seat cover does not become detached therefrom while a user is seated on the toilet seat cover.

The top layer is preferably formed from paper and nylon for preventing water from passing therethrough. Likewise, the bottom layer is preferably formed from paper and nylon for preventing water from passing therethrough. The middle layer may include a plurality of air bubbles for allowing the middle layer to change shape corresponding to a force applied thereon. For example, the middle layer is preferably formed from foam for providing a cushion when a user sits on the toilet seat cover. In addition, the middle layer may include a deodorizing element impregnated therein and releasable into the atmosphere when a user sits on the toilet seat.

The means for removably attaching the toilet seat cover to a toilet seat preferably includes an adhesive attached to the lower surface of the bottom layer. Such means may include a plurality of adhesive patches or strips substantially equally spaced apart and attached between the inner and outer edge portions of the bottom layer. The plurality of adhesive patches each include a lower surface and each may further include a member removably attached to the lower surface thereof for preventing the plurality of adhesive patches from contacting a surface prior to being placed onto a toilet seat.

Furthermore, a method for making toilet seat cover preferably includes providing a top layer having an outer edge portion and an inner edge portion disposed substantially uniformly therefrom wherein the top layer further has an upper surface and a lower surface extending between the inner and outer edge portions. The method further includes providing a bottom layer having an outer edge portion and an inner edge portion disposed substantially uniformly therefrom wherein the bottom layer further has an upper surface and a lower surface extending between the inner and outer edge portions. The method further includes sandwiching a middle layer between the top and bottom layers and disposed between the inner and outer portions of the top and bottom layers. The method further includes providing an adhesive for removably attaching the toilet seat cover onto a toilet seat so that the toilet seat cover does not become detached therefrom while a user is seated the toilet seat cover.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art.

Figure 1:
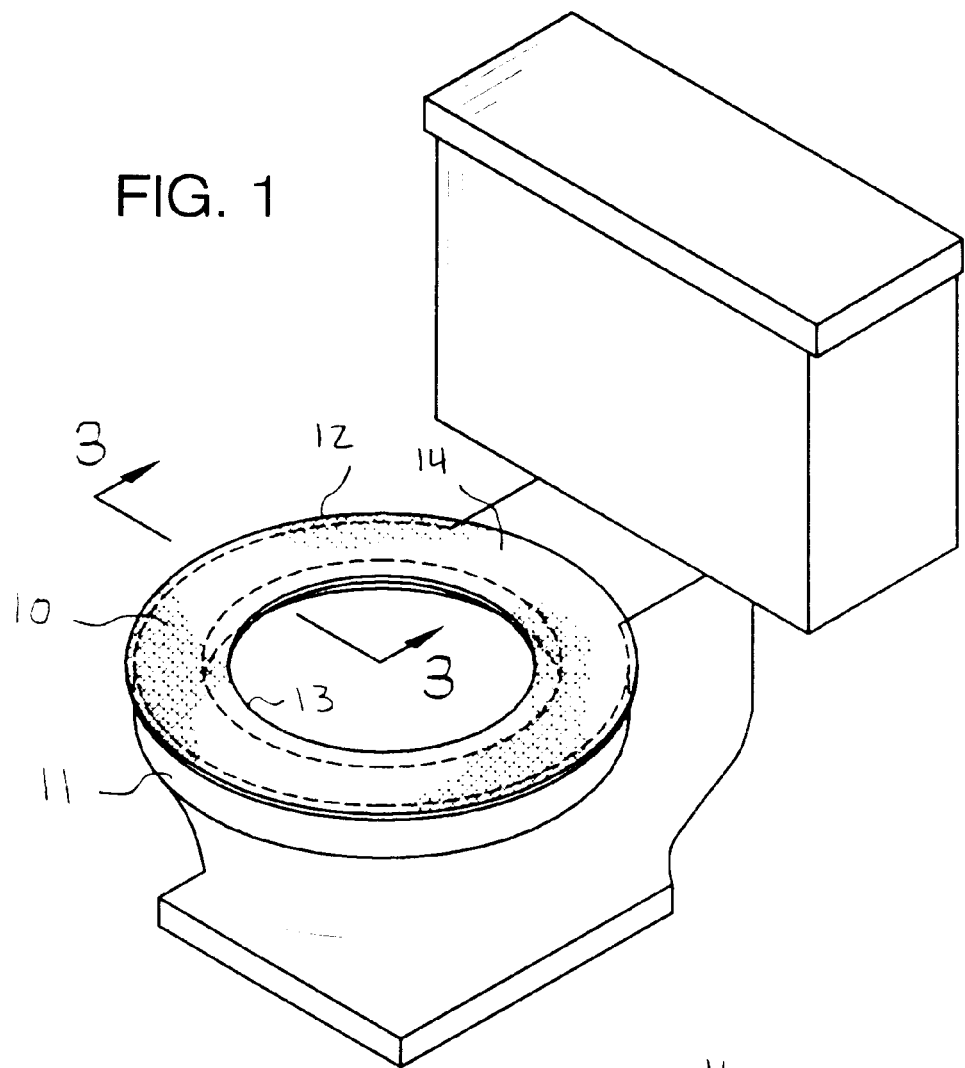
FIG. 1 is a perspective view showing a toilet seat cover attached to a toilet seat, in accordance with the present invention.

The toilet seat cover of the present invention is referred to generally in FIG. 1 by reference numeral 10 and is intended to protect a user from contacting urine, feces and bacteria while sitting on a toilet seat 11. It should be understood that the toilet seat cover 10 may be attached to various shaped toilet seats 11 and should not be limited to the particular toilet seat 11 illustrated in FIG. 1.

The toilet seat cover 10 includes top layer 14 having a generally annular shape. Such a top layer 14 includes an outer edge portion 12 and inner edge portion 13. The inner edge portion 13 defines the opening formed by the inner width of the toilet seat cover 10, which generally corresponds to the opening of a conventional toilet seat 11.

Figure 2:
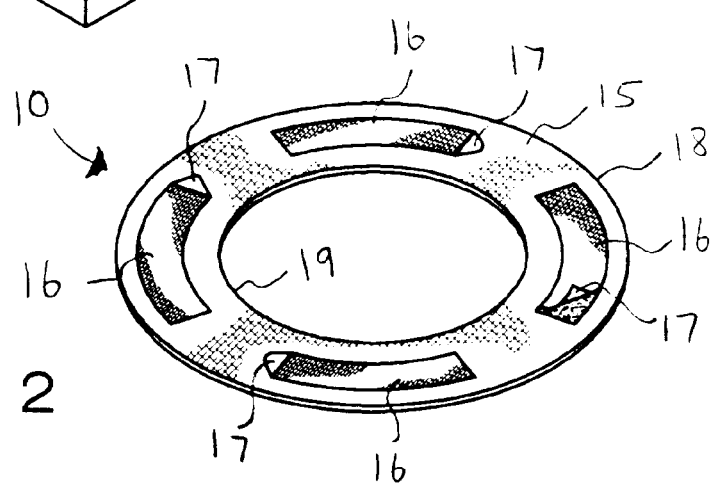
FIG. 2 is a perspective view showing the bottom of the toilet seat cover of FIG. 1.

Now referring to FIG. 2, the bottom layer 15 of the toilet seat cover 10 is shown as including outer edge portion 18 and inner edge portion 19, which are both substantially similar in shape and size to the outer and inner edge portions 12, 13 of top layer 14. Both top and bottom layers 14, 15 are substantially planar and are preferably formed from waterproof material. Such waterproof material may be a composite material including paper and nylon, as readily known in the industry. The nylon (not shown) may be cut into individual strips and attached to the paper for providing water resistant top and bottom layers 14, 15. Furthermore, the nylon strips may be impregnated into the paper so that when a user sits on the toilet seat cover 10, bacteria or liquids predisposed on the toilet seat 11 cannot pass through the top and bottom layers 14, 15.

The toilet seat cover 10 further includes a plurality of adhesive strips or patches 16 spaced apart from each other and attached to the bottom layer 15. Such adhesive strips 16 are disposed between the inner and outer edge portions 19, 18 of the bottom layer 15 and conform to the general annular shape thereof. Such adhesive strips 16 may be formed from a conventional adhesive, as readily known to a person of ordinary skill in the art. Furthermore, each adhesive strip 16 includes a peel off layer 17 so that the adhesive may be exposed only when a user removes such layers 17 just prior to placing the toilet seat cover 10 on a toilet seat 11. In particular, each peel off layer 17 includes a tab at one end thereof so that a user can easily pull off the adhesive layer 17 during times of urgency.

Figure 3:
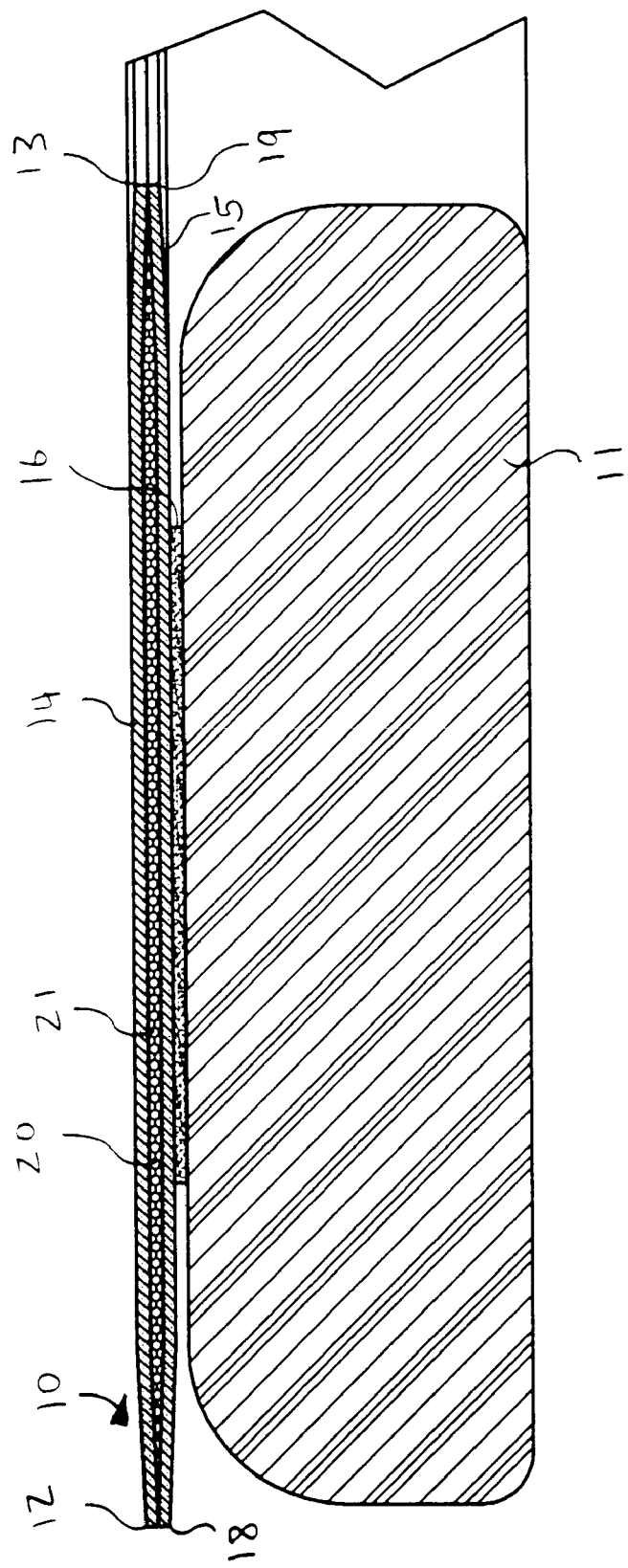
FIG. 3 is an enlarged cross-sectional view of the toilet seat cover and along line 3—3 shown in FIG. 1.

Now referring to FIG. 3, a cross-sectional view of the toilet seat cover 10 is shown as further including a middle layer 20 disposed between the top and bottom layers 14, 15. In particular, middle layer 20 is connected to a lower surface of top layer 14 and an upper surface of bottom layer 15. Such a middle layer 20 extends along the general shape of the toilet seat cover 10 and is disposed between the inner and outer edge portions 12, 13 and 18, 19 of the top and bottom layers 14, 15, respectively.

As can be seen in the FIG. 3, the outer edge portions 12, 18 of the top and bottom layers 14, 15 are attached to one another, respectively. Likewise, the inner edge portions 13, 19 of the top and bottom layers 14, 15 are connected to one another, respectively. Thus, the middle layer 20 is securely maintained between the top and bottom layers 14, 15.

The adhesive strips or patches 16 can be seen as contacting the toilet seat 11 for maintaining the toilet seat cover 10 thereon while a user is seated on the toilet seat cover 10. Of course, after a user gets off of the toilet seat cover 10, he/she may remove same from the toilet seat 11 by simply peeling off the toilet seat cover 10 from the toilet seat 11. Therefore, the adhesive strips 16 are not permanent adhesive strips so that the toilet seat cover 10 may be removably attached to the toilet seat 11. Advantageously, when the toilet seat cover 10 is attached to the toilet seat 11 via adhesive strips 16, the toilet seat cover 10 will not slip into the toilet bowl prior to or during use.

Furthermore, the middle layer 20 is preferably water soluble and includes a plurality of randomly disposed air bubbles 21 therein for allowing the middle layer 20 to compress and conform to the general shape of a user seated on the toilet seat cover 10. For example, the middle layer 20 may be formed from conventional foam material, as readily known in the art, or other suitable material. Such foam material may have a thickness generally equal to the thickness of the top and bottom layers 14, 15. Of course, the thickness of the middle layer 20 may be adjusted to meet the specific needs for its intended use. Because the toilet seat cover 10 includes multiple layers formed from waterproof material the user is protected from bacteria and liquids resting on a toilet seat 11. The toilet seat cover 10 also may be simply flushed down the toilet after use because the materials forming the toilet seat cover 10 are preferably water-soluble and therefore able to be decomposed by conventional sewage systems.

Such a middle layer 20 also may be impregnated with a deodorizing agent or element, as readily known to person of ordinary skill in the art. The deodorizing element may be released or activated when a user sits on the toilet seat cover 10 and compresses the air bubbles 21 located within the middle layer 20 to thereby cause the deodorizing scent to permeate through the top and bottom layers 14, 15 and into the atmosphere.

Such a toilet seat cover 10 may be packaged in a vertically stacked arrangement so that the outermost or topmost toilet seat cover 10 can be easily removed from its corresponding package without disturbing or removing the remaining toilet seat covers stacked therebeneath.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the: United States is:

1. A hygiene-promoting apparatus comprising:
a toilet seat cover including
a top layer having an outer edge portion and an inner edge portion disposed substantially uniformly therefrom, said top layer further having an upper surface and a lower surface extending between the inner and outer edge portions;
a bottom layer having an outer edge portion and an inner edge portion disposed substantially uniformly therefrom, said bottom layer further having an upper surface and a lower surface extending between the inner and outer edge portions;
a middle layer sandwiched between said top and bottom layers and disposed between the inner and outer portions of said top and bottom layers; and
means for removably attaching said toilet seat cover onto a toilet seat so that said toilet seat cover does not become detached therefrom while a user is seated said toilet seat cover;
said top and bottom layers being formed from water proof material for preventing liquid from passing therethrough;
wherein said top and bottom layers are coextensively shaped and are suitably sized and shaped for fitting on a toilet seat, each said top and bottom layers having a substantially annular shape provided with a centrally registered opening formed therein for allowing the user to freely deposit excrements into the toilet while seated on the toilet seat:
wherein said top and bottom layers have coextensive thicknesses:
wherein said means for removable attaching said toilet seat cover to a toilet seat comprises a plurality of adhesive patches substantially equally spaced apart and attached between the inner and outer edge portions of said bottom layer;
wherein said plurality of adhesive patches each include a lower surface and each further comprise a cover member removably attached to the lower surface thereof for preventing said plurality of adhesive patches from contacting a surface prior to being placed onto a toilet seat;
wherein each said adhesive patch includes a tab at one end thereof so that a user can easily pull off the adhesive layer during times of urgency.

2. The apparatus claim 1, wherein said middle layer comprises a plurality of air bubbles for allowing said middle layer to change shape corresponding to a force applied thereon.

3. The apparatus of claim 1, wherein said middle layer is formed from foam material for providing a cushion when a user sits on said toilet seat cover.

4. The apparatus of claim 1, wherein said middle layer comprises a deodorizing element impregnated therein and releasable into the atmosphere when a user sits on said toilet seat.

* * * * *